Figure 2A:
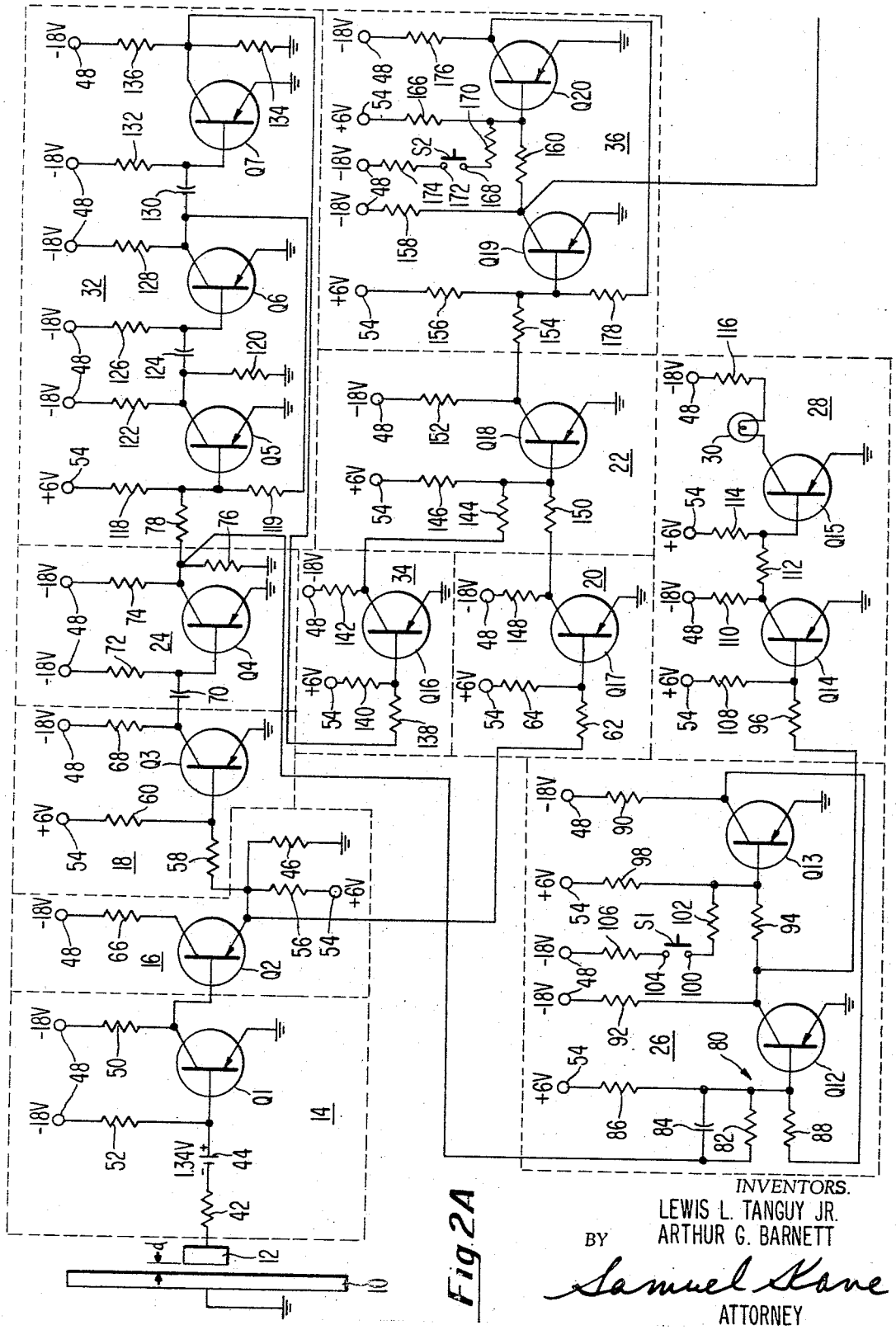

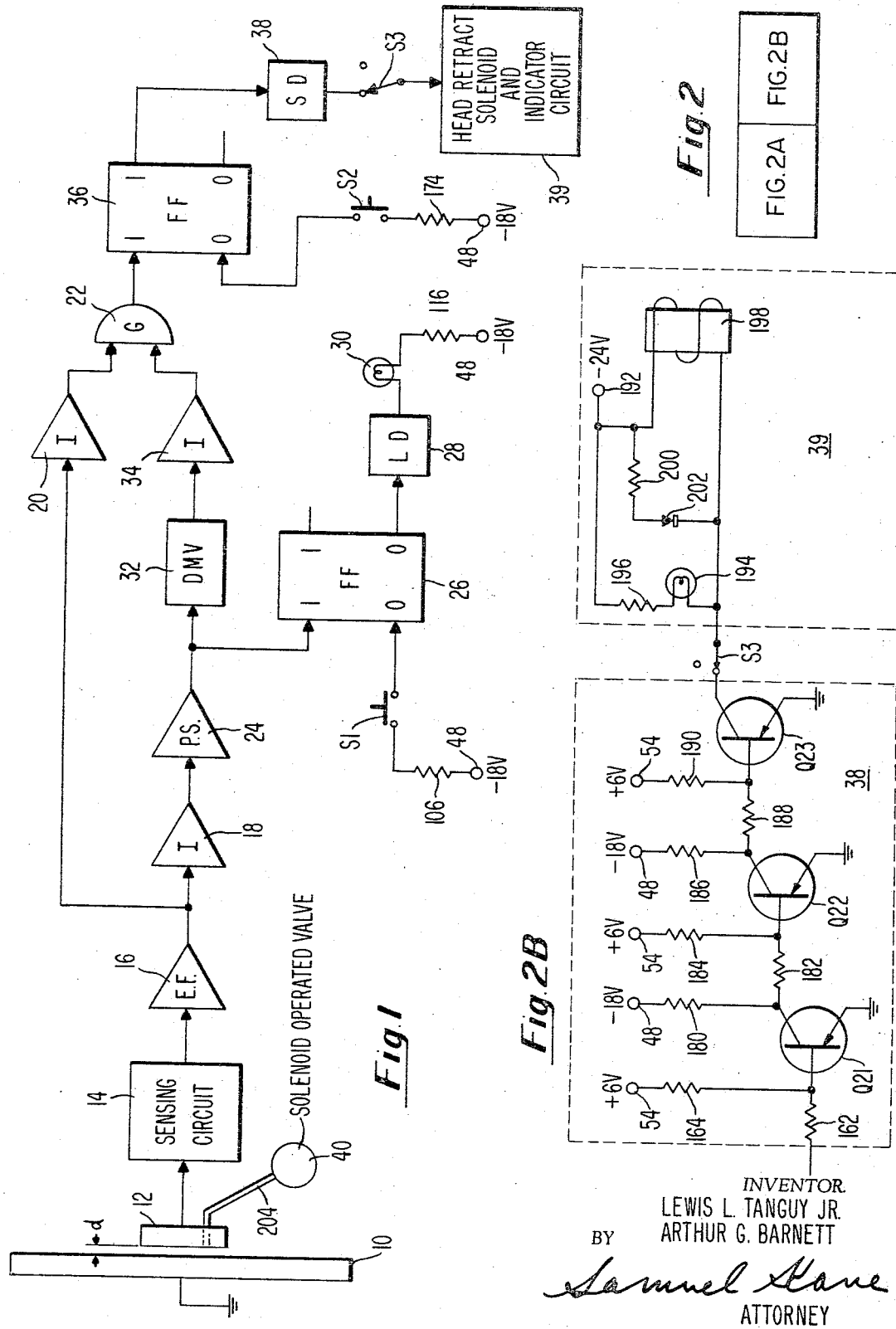

July 4, 1967 L. L. TANGUY, JR., ET AL 3,329,943
HEAD-TO-DISK SEPARATION DETECTOR
Filed Feb. 8, 1963 4 Sheets-Sheet 2

INVENTORS.
LEWIS L. TANGUY JR.
ARTHUR G. BARNETT
BY Samuel Kane
ATTORNEY

INVENTORS.
LEWIS L. TANGUY JR.
ARTHUR G. BARNETT
BY
*Samuel Kane*
ATTORNEY

United States Patent Office 3,329,943
Patented July 4, 1967

3,329,943
HEAD-TO-DISK SEPARATION DETECTOR
Lewis L. Tanguy, Jr., Paoli, and Arthur G. Barnett, Phoenixville, Pa., assignors to Burroughs Corporation, Detroit, Mich., a corporation of Michigan
Filed Feb. 8, 1963, Ser. No. 257,146
3 Claims. (Cl. 340—174.1)

This invention relates generally to electronic circuits and more particularly to such circuits for indicating and controlling the separation between two electrically conductive surfaces. While not limited thereto the invention finds special application as a monitor circuit for magnetic memory elements such as magnetic disks and drums and their cooperating read-write heads.

An object of the invention is to provide an electronic circuit for sensing the status of separation between two relatively movable electrically conductive surfaces.

Another object of the invention is to provide an electronic circuit which will give an indication, audible or visible, to an operator in the event the distance between two electrically conductive surfaces has reached a predetermined limit.

A further object of the invention is the provision of electronic circuit means which will separate two relatively movable electrically conductive surfaces in the event that such surfaces should touch or make electrical contact.

Another object of the invention is the provision of electronic circuit means which will separate two relatively movable electrically conductive surfaces, one of which is rotating, in the event that the angular velocity of the rotating surface deviates from a predetermined limit.

A more specific object of the invention is to provide a monitor circuit for checking the status of separation between a magnetic record element and a cooperating magnetic recording element.

Another object of the invention is to provide electronic circuit means for checking the status of head-to-disk separation, or head-to-drum separation in magnetic memory devices of this general character.

A further object of the invention is to provide a detection, alarm and control means for protection of a disk or drum memory in the event that a cooperating read-write head should touch the recording surface of the disk or drum, respectively.

In accordance with the above objectives, and considered first in its broad aspects, the invention contemplates the use of a sensing circuit operatively connected across the gap between spaced apart electrically conductive surfaces and responsive to the electrical conduction occurring between the surfaces as they come together for actuating an indicating means, and preferably also for actuating a control means effective automatically for separating the electrically conductive surfaces if the electrical conduction should persist for a predetermined time. In the case where one of the electrically conductive surfaces is rotating, preferably the invention also provides a second sensing circuit responsive to its rotational speed for separating the surfaces if the speed falls below an established limit.

Figure 4:
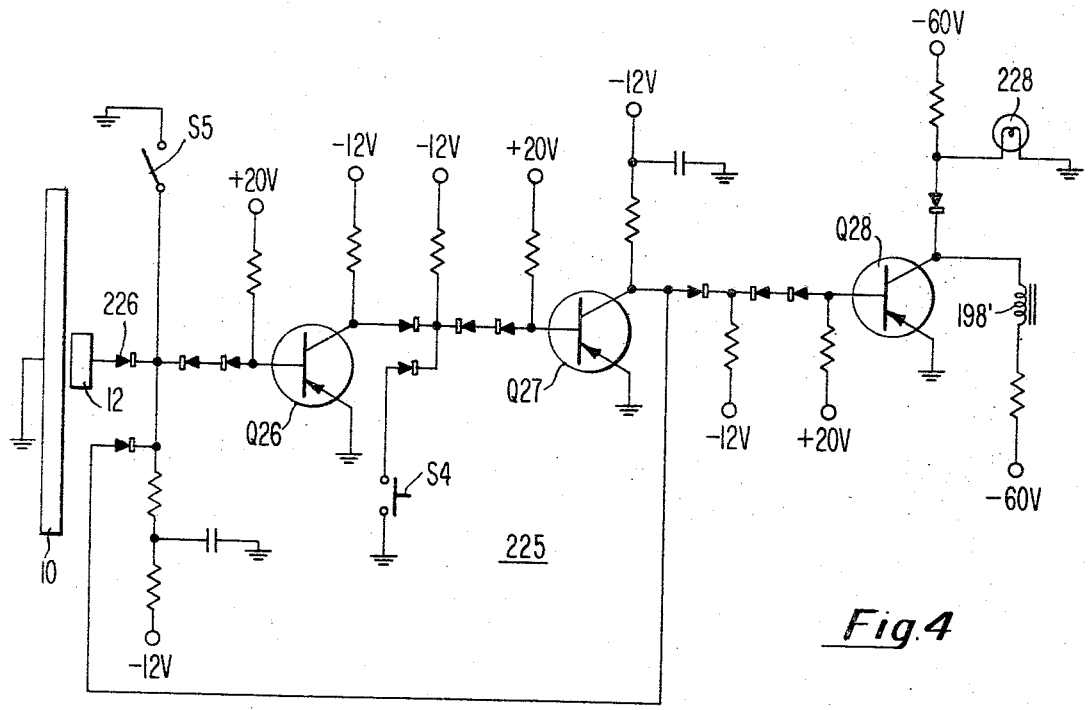
Figure 3:
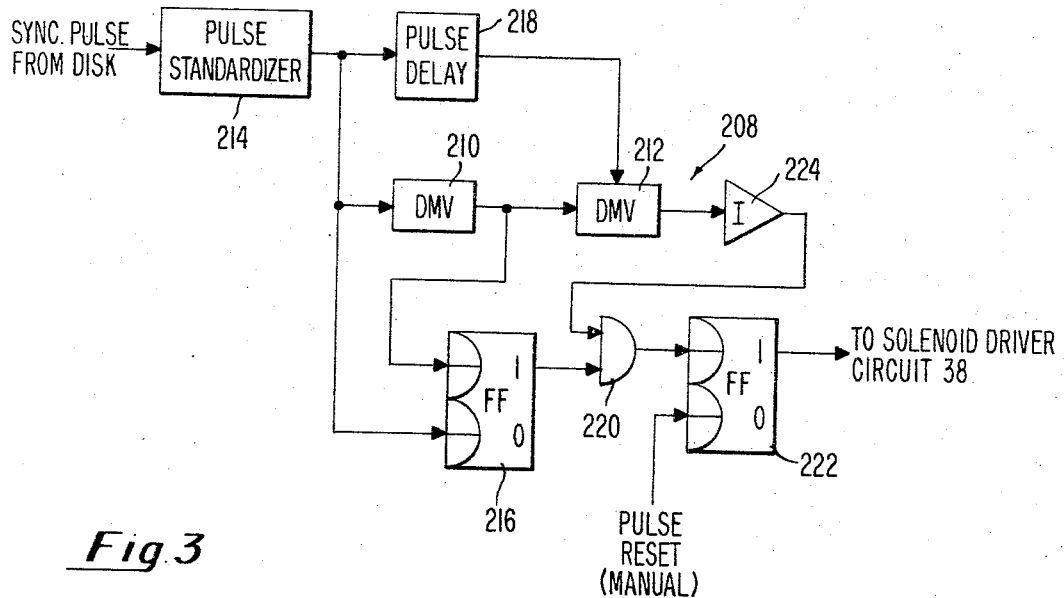
Figure 5:
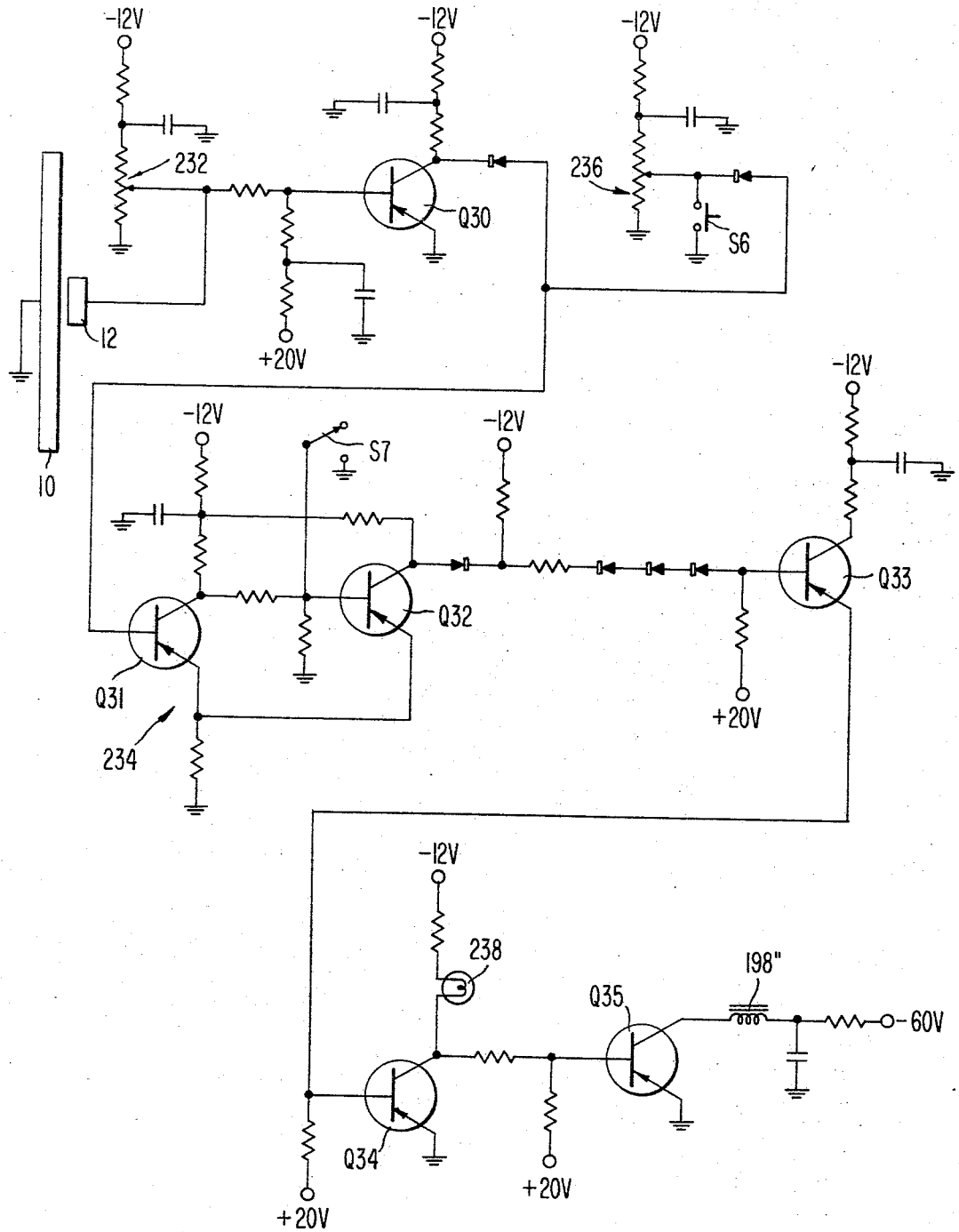

The invention will be more clearly understood when the following description of specific embodiments thereof is read in conjunction with the accompanying drawings in which:

FIG. 1 is a diagram, substantially in block form, of a touch indicator and control circuit constructed in accordance with the invention;

FIGS. 2A and 2B taken together and placed side-by-side, as shown in FIG. 2, illustrate a schematic diagram of the touch indicator and control circuit of FIG. 1, but with a solenoid operated valve and associated conduit omitted;

FIG. 3 is a block diagram of a sensing circuit for separating the electrically conductive surfaces if the speed of the rotating surface deviates from an established limit, the deviation in the illustrated embodiment constituting a reduction in speed; and FIGS. 4 and 5 are schematic diagrams of variations of the invention.

For a general description of the illustrated embodiment of the invention reference is made to the block diagram in FIG. 1 in which a rotatable disk memory 10, and read-write head 12 are illustrated diagrammatically and shown in spaced apart relation representative of their normal operating condition, to indicate a head-to-disk gap or spacing $d$ which, for example, may be of the order of 100 microinches. The read-write head 12 and disk memory 10 may be of the kind disclosed in a copending patent application of Erik R. Solyst, Ser. No. 137,447, filed Apr. 28, 1961, now U.S. Pat. No. 3,229,268, entitled "Electromagnetic Transducer Modular Memory Apparatus," and assigned to the same assignee as the present invention, in which case the head 12 may be so mounted as to be permitted to follow the contour of the disk 10 by moving toward or away from it, thereby to take up on any run-out of the disk and to maintain constant the predetermined head-to-disk gap. There is always the slight possibility of physical contact between the head and disk, however, either before or upon the occurrence of such an event, the present invention automatically furnishes remedial control action as well as providing a warning of the situation, as will appear more clearly hereinafter.

The construction of the present invention is such that if the head 12 should move toward the disk 10 and close the gap $d$, or reduce it to a predetermined dimension, in this embodiment approximately 6 to 8 microinches, electrical conduction will be established through the head 12 and disk 10 indicating an electrical "touch," whereupon a sensing circuit 14, to which the head 12 is coupled, will provide an output to an emitter-follower circuit 16 whose output is coupled to two inverters 18 and 20, the inverter 20 being coupled to a coincidence detector which, in the present embodiment, takes the form of an AND gate 22. The inverter 18 drives a pulse standardizer circuit 24 which triggers a bistable device, in this embodiment a flip-flop 26, whose output operates a lamp driver circuit 28 for providing an indication sensible to an operator, in this embodiment by lighting a touch indication lamp 30. The pulse standardizer 24 also provides a standard trigger pulse for actuating a delay multivibrator 32 whose output is a pulse signal one millisecond after a "touch" has occurred between the head 12 and disk 10 thereby to actuate an inverter 34, also coupled to the AND gate 22. If the "touch" between the head 12 and the disk 10 persists for at least one millisecond, the gate 22 will trigger a bistable device, in this embodiment a flip-flop 36, whose output will actuate a solenoid driver circuit 38 for physically retracting and separating the head 12 from the disk 10 through the medium of a solenoid in a head retract solenoid and indicator circuit 39 and an air valve 40 operated by the solenoid.

Turning now to the details of the illustrated embodiment, and first with reference to FIG. 2A in the drawings, the sensing circuit 14 utilizes a resistor 42 which is coupled to the read-write head 12 and to one terminal of a source of potential 44, in this case the negative terminal of a 1.34 volt battery whose positive terminal is coupled to the base of a PNP transistor Q1. In this connection, it is to be noted that all the transistors used in the illustrated embodiment are PNP type, however this is not a limiting factor since NPN-type transistors may be used if desired, provided that proper adjustments are made to biasing voltages and polarities. Also, in the present embodiment the emitter electrodes of all the transistors, except transistor Q2, are directly coupled to ground. The emitter of transistor Q2 is coupled to ground along one path through a resistor 46.

The collector of transistor Q1 is coupled to a source of negative potential 48 through a resistor 50 and directly coupled to the base of transistor Q2 in the emitter-follower circuit 16. The base of Q1 is also coupled to the source of negative potential 48 through a resistor 52. The emitter of transistor Q2 is also coupled along one path to a source of positive potential 54 through a resistor 56 and along a parallel path to the same source of potential 54 through resistors 58 and 60 in the inverter circuit 18. The emitter of transistor Q2 is also coupled along another path to the base of transistor Q17 through a resistor 62 and to the source of positive potential 54 through the resistor 62 and a resistor 64. The collector of transistor Q2 is coupled to the source of negative potential 48 through a resistor 66.

The base of transistor Q3 is coupled to the resistor 58, and to the source of positive potential 54 through the resistor 60. Its collector is coupled to the source of negative potential 48 through a resistor 68 and to the base of transistor Q4 in the pulse standardizer circuit 24 through a capacitor 70. The base of Q4 is also coupled to the source of negative potential 48 through a resistor 72, and its collector coupled to the same source of negative potential through a resistor 74. The collector of transistor Q4 is coupled to ground along one path through a resistor 76, and to the base of transistor Q5 in the delay multivibrator circuit 32 through a resistor 78. The collector of transistor Q4 is also coupled to the base of transistor Q12 in the flip-flop circuit 26 through a network 80 consisting of a resistor 82 and capacitor 84.

The transistor Q12 has its base coupled to the network 80 and along another path to the source of positive potential 54 through a resistor 86. The base of transistor Q12 is also coupled to the source of negative potential 48 through resistors 88 and 90, and through resistor 88 to the collector of transistor Q13. The collector of transistor Q12 is coupled to the source of negative potential 48 through a resistor 92 and to the base of transistor Q13 through a resistor 94. The collector of transistor Q12 is also coupled to the base of transistor Q14 in the lamp driver circuit 28 through a resistor 96. The base of transistor Q13 is also coupled to the source of positive potential 54 through a resistor 98 and to one terminal 100 of an indicator reset switch S1 through a resistor 102. The other terminal 104 of the switch S1 is coupled to the source of negative potential 48 through a resistor 106.

In the lamp driver circuit 28 the base of transistor Q14 is also coupled to the source of positive potential 54 through a resistor 108 and its collector coupled to the source of negative potential 48 through a resistor 110. The collector of transistor Q14 is also coupled to the base of transistor Q15 through a resistor 112 and to the source of positive potential 54 through the resistor 112 and a resistor 114. The collector of transistor Q15 is coupled to the source of negative potential 48 through the touch indicator lamp 30 and a resistor 116.

In the delay multivibrator circuit 32 the base of transistor Q5 is coupled to the resistor 78 and through a resistor 118 to the source of positive potential 54. The base of transistor Q5 is also connected to the collector of transistor Q6 through a resistor 119. The collector of transistor Q5 is coupled along one path to ground through a resistor 120 and through a resistor 122 to the source of negative potential 48. The collector of transistor Q5 is also coupled to the base of transistor Q6 through a capacitor 124 and along another path to the source of negative potential 48 through the capacitor 124 and a resistor 126. The collector of transistor Q6 is coupled to the source of negative potential 48 along one path through a resistor 128 and along another path through a capacitor 130 and a resistor 132. The base of Q7 is coupled to the capacitor 130 and to the source of negative potential 48 through resistor 132. The collector of transistor Q7 is coupled to ground through a resistor 134 and to the source of negative potential 48 through a resistor 136.

The collector of transistor Q7 is also coupled to the base of transistor Q16 in the inverter circuit 34 through a resistor 138 and to the source of positive potential 54 through the resistor 138 and a resistor 140. The collector of transistor Q16 is coupled to the source of negative potential 48 through a resistor 142 and to the source of positive potential 54 through a resistor 144 and a resistor 146 in the AND gate circuit 22. The collector of transistor Q16 is also coupled to the base of transistor Q18 through the resistor 144.

The collector of transistor Q17 is coupled to the source of negative potential 48 through a resistor 148 and to the base of the transistor Q18 in the AND gate circuit 22 through a resistor 150.

The collector of transistor Q18 is coupled to the source of negative potential 48 through a resistor 152 and to the source of positive potential 54 through a resistor 154 and resistor 156 in the flip-flop circuit 36. The collector of transistor Q18 is also coupled to the base of transistor Q19 in the flip-flop circuit 36 through the resistor 154.

The collector of transistor Q19 is coupled to the source of negative potential 48 through a resistor 158 and to the base of transistor Q20 through a resistor 160. The collector of transistor Q19 is also coupled to the base of transistor Q21 in the solenoid driver circuit 38 (FIG. 2B) through a resistor 162 and to the source of positive potential 54 through the resistor 162 and a resistor 164.

The base of the transistor Q20 (FIG. 2A) is also coupled to the source of positive potential 54 through a resistor 166 and to one terminal 168 of a control reset switch S2 through a resistor 170. The other terminal 172 of the switch S2 is coupled to the source of negative potential 48 through a resistor 174. The collector of transistor Q20 is coupled to the source of negative potential 48 through a resistor 176 and to the base of transistor Q19 through a resistor 178.

In the solenoid driver circuit 38 (FIG. 2B) the collector of transistor Q21 is coupled to the source of negative potential 48 through a resistor 180 and to the base of transistor Q22 through a resistor 182. The collector of transistor Q21 is coupled to the source of positive potential 54 through the resistor 182 and a resistor 184.

The collector of transistor Q22 is coupled to the source of negative potential 48 through a resistor 186 and to the base of transistor Q23 through a resistor 188. The collector of transistor Q22 is also coupled to the source of positive potential 54 through the resistor 188 and a resistor 190. The collector of transistor Q23 is coupled to a source of negative potential 192 through a manual retract switch S3, an indicator lamp 194 and a resistor 196. Also connected between the switch S3 and the source of negative potential 192 in a parallel circuit is a head retract solenoid 198. A circuit comprising a resistor 200 and a diode 202 connected across the solenoid 198 serves to suppress the counter electromotive force induced in the solenoid when it is deenergized.

The initial condition of the transistors during normal operation of the memory disk 10 and head 12 is shown in the following table with those conducting that are in the ON condition and those nonconducting that are in the OFF condition:

| ON: | OFF |
|---|---|
| Q1 | Q3 |
| Q2 | Q5 |
| Q4 | Q12 |
| Q6 | Q15 |
| Q7 | Q16 |
| Q13 | Q17 |
| Q14 | Q19 |
| Q18 | Q22 |
| Q20 | |
| Q21 | |
| Q23 | |

Also, during normal operation, switches S1 and S2 are open, the manual retract switch S3 is closed, the indicator lamp 194 is lit and lamp 30 is extinguished. The head retract solenoid 198 is normally energized in the present embodiment to close the valve 40 and prevent head retraction by cutting off air flow through a conduit 204 (FIG. 1).

The transistor Q1 is ON and normally conducting with saturated collector near ground potential by virtue of base current supplied through the resistor 52 and the −18 v. source of potential 48. The battery 44 supplies a 1.34 v. potential which appears across the head-to-disk gap $d$. Under these conditions and with the source voltages shown, the base voltage of transistor Q1 is below ground potential by a few hundred millivolts, and with the floating negative terminal of the source 44 at a potential of 1.34 v. below the potential of the base of Q1.

If the head 12 should move toward the disk 10 and close the gap $d$, or reduce it as indicated previously to a dimension of approximately 6 to 8 microinches, an electrical "touch" will occur and the ensuing conduction through the head 12 and disk 10 will force the negative terminal of the source 44 to ground potential and the base of Q1 to a positive potential of 1.34 v. thereby causing transistor Q1 to cut off.

Turning OFF of Q1 causes its collector potential to go negative and the emitter of Q2 to fall negatively likewise. As the potential on the emitter of Q2 falls, Q3 will turn ON and its collector will rise to approximately ground potential to provide a positive-going voltage to the base of Q4 by way of capacitor 70, thereby turning Q4 OFF.

When Q4 goes OFF the potential on its collector will go negative thereby turning ON Q12. Turning ON of Q12 will cause its collector potential to rise to approximately ground and a positive-going voltage to appear on the base of Q14 thereby cutting this transistor OFF. As the potential on the collector of Q12 thus rises to approximately ground, it will also cause a positive-going voltage to appear on the base of Q13 thereby turning it OFF and causing its collector to go negative and thereby hold Q12 turned ON.

When Q14 turns OFF its collector potential will go negative and cause Q15 to turn ON thereby lighting the touch indicator lamp 30 to provide a visual indication to the operator that a touch between the disk 10 and the head 12 of some duration has occurred.

By manually operating the indicator reset switch S1 the flip-flop 26 will be reset with Q12 turning OFF and Q13 turning back ON. This will also turn ON Q14 and turn OFF Q15, thereby to extinguish the touch indicator lamp 30.

At the time of the initial "touch" between the disk 10 and head 12, the decrease in potential on the emitter of Q2 will cause a negative-going voltage to appear on the base of Q17 thereby turning this transistor ON so that its collector will rise to approximately ground potential and tend to turn OFF Q18. However, Q16 is still OFF at this time so that its collector is sufficiently negative to hold Q18 ON.

When Q4 turns OFF its collector potential will go negative thereby turning ON Q5 which will then provide a positive-going voltage to the base of Q6 by way of the capacitor 124 and turning Q6 OFF. Turning OFF of Q6 will have no effect on the ON condition of Q7 since it will tend to hold it ON by biasing it more in the forward direction by providing a negative-going voltage by way of the capacitor 130. When Q6 turns OFF, however, its collector will go negative thereby holding Q5 turned ON after the transient pulse from Q4 has ended, and until the end of the transient pulse across the capacitor 124 one millisecond later; that is, one millisecond after the start of the "touch" between the disk 10 and the head 12.

As Q6 turns ON again its collector potential will rise to approximately ground and a positive-going voltage will appear on the base of Q7 by way of capacitor 130, thereby turning Q7 OFF and causing its collector potential to go negative. Transistor Q16 will then turn ON and its collector potential will rise to approximately ground. This condition, together or coinciding with the ground condition of the collector of Q17, will turn Q18 OFF. When Q18 turns OFF its collector potential will go negative and thereby turn ON Q19 to cause its collector potential to rise to approximately ground and thereby cut OFF Q20. The collector of Q20 will then go negative to hold Q19 ON.

As Q19 turns ON a positive-going voltage will appear on the base of Q21 (FIG. 2B) thereby turning it OFF and causing its collector potential to go negative and thereby turn ON Q22. This will cause the collector potential of Q22 to rise to approximately ground and cut OFF Q23 thereby extinguishing the indicator lamp 194, to indicate that a "touch" of at least one millisecond has occurred, and de-energizing the head retract solenoid 198. De-energization of this solenoid will serve to actuate the air valve 40 (FIG. 1) to admit compressed air to the disk 10 through the conduit 204 and the head 12, thereby retracting the head 12 and separating it from the disk 10.

To reset the flip-flop 36, the control reset switch S2 is actuated manually thereby turning Q19 OFF and Q20 back ON to thereby restore the transistors Q21, Q22 and Q23 to their initial ON or OFF condition, respectively and lighting the indicator lamp 194 and energizing the head retract solenoid 198.

From the description thus far, it will be seen that certain features of the present invention are embodied in an indicator means for signifying to an operator the event of a "touch" between two electrically conductive surfaces, and in means for causing the surfaces to separate if the "touch" should persist for a predetermined time.

Another feature of the invention resides in a sensing circuit 208 shown in block diagram form in FIG. 3, for effecting automatic separation of the head 12 and disk 10 in the event that the rotational speed of the disk should fall below a predetermined limit, and preferably also in such event to provide an indication sensible to an operator.

The sensing circuit 208 compares the period of each disk revolution to the delay time of a timing device which, in the present embodiment, is illustrated as two cascaded delay multivibrators 210 and 212. If the disk revolution period should become less than the total delay time of the multivibrators, as by slowing down for one reason or another, the sensing circuit 208 will effect separation of the head and disk.

The sensing circuit 208 is actuated by a sync pulse induced once for each rotation of the disk 10. One means for obtaining such a pulse may take the form of a small permanent magnet and magnetic sensing head, not shown, in which case the magnet may be connected to the rotating disk 10, or to another part connected to it and rotating with it, and the magnetic sensing head may then be fixed relative to the rotating magnet.

The sync pulse is amplified by suitable means, not shown, and fed to a pulse standardizer circuit 214 whose output sets a flip-flop 216 to the "0" state. The sync pulse also triggers the delay multivibrator 210 whose delay time in the present embodiment is five milliseconds. The same pulse also goes through a pulse delay circuit 218, which delays it by the time of its own width, in this case 25 microseconds, and the delayed pulse then resets the delay multivibrator 212. In the present embodiment, the delay multivibrator 212 has a delay time of 14 milliseconds. For different operating conditions of the disk memory 10, requiring different reference time delays, the delay period of one of the delay multivibrators, 210 or 212, can be made adjustable.

The output pulse from the delay multivibrator 210 triggers the delay multivibrator 212 to start it on its cycle, and switches the flip-flop 216 to the "1" state, the flip-flop 216 thereby providing a signal to the input of an AND gate 220 whose output is connected to a flip-flop 222, the latter normally in its "0" state during operation of the disk 10 and head 12.

If the speed of the disk 10 is sufficiently high, each successive sync pulse will reset the flip-flop 216 to the "0" state and through the pulse delay circuit 218 will cause the delay multivibrator 212 to reset before its normal delay cycle has been completed. Resetting of the flip-flop 216 to the "0" state disables the AND gate 220 before the delay multivibrator 212 is reset so that any transient output pulse of the latter, which goes through an inverter 224, will appear at the disabled AND gate 220. Consequently the flip-flop 222 will remain in its "0" state and normal operation will continue.

If the disk 10 should slow down in speed below the predetermined limit, successive sync pulses will be separated by a longer time than the total delay time of the delay multivibrators 210 and 212 which, in the illustrated embodiment is 19 milliseconds. Therefore the delay multivibrator 212 will complete its delay cycle before the next sync pulse arrives and provide a signal to the AND gate 220 through the inverter 224, thereby resulting in coincidence of signals at the AND gate 220 from the flip-flop 216 and delay multivibrator 212. The output of the AND gate 220 will thereupon switch the flip-flop 222 to its "1" state. The output of flip-flop 222, similar to the output of flip-flop 36, is connected by suitable gating means, not shown, to the solenoid driver circuit 38, so that de-energization of the head retract solenoid 198 will be effected to separate the head 12 and disk 10, and extinguish the lamp 194, as described above for the condition of a prolonged "touch." In this connection it is to be noted that the flip-flop 222 may be dispensed with, if desired, in which case the outputs of the AND gates 22 and 220 would be connected by suitable gating means to the flip-flop 36. However, the flip-flop 222 has been included in the present embodiment to show that its output might be used to actuate a separate indicating means, not shown, solely for the purpose of indicating slow-down of the disk 10.

A variation of the invention with respect to the "touch" and head retract aspects is shown in the circuit in FIG. 4 in which three PNP-type transistors Q26, Q27 and Q28 are connected in series, and with the output of transistor Q27 returned to the input of transistor Q26 to form a bistable circuit 225. In this variation also the transistors may be NPN-type, if desired, provided that proper adjustments are made to biasing voltages and polarities.

During normal operation of the disk 10 and head 12 with the circuit variation of FIG. 4, the transistors Q26 and Q28 are in the ON condition and conducting, and the transistor Q27 is in the OFF condition and nonconducting. If a "touch" should occur between the head 12 and disk 10 a ground will appear through a diode 226 at the input to transistor Q26 causing it to turn OFF. Transistor Q27 will then turn ON and transistor Q28 will turn OFF thereby de-energizing the head retract solenoid 198' to effect head retraction, and permitting the normally extinguished indicator lamp 228 to light. Resetting of the bistable circuit 225 is accomplished by depressing a normally open switch S4, and manual retraction of the head 12 is effected by closing a normally open switch S5.

Another variation of the invention with respect to the "touch" and head-retract aspects is shown in the circuit in FIG. 5 in which the potential difference between the disk 10 and head 12 is obtained by adjustment of a potentiometer 232. This circuit also uses PNP-type transistors, however NPN-type may be used, if desired, provided that proper adjustments are made to biasing voltages and polarities.

During normal operation of the disk 10 and head 12 with the circuit variation of FIG. 5, the transistors Q30, Q32, Q33 and Q35 are in the ON condition and conducting, and the transistors Q31 and Q34 are in the OFF condition and nonconducting. The transistors Q31 and Q32 together constitute a standard Schmitt trigger circuit 234, the operating point of which is set by a potentiometer 236.

If an electrical "touch" should occur between the disk 10 and head 12 transistor Q30 will turn OFF so that its collector potential will go negative, thereby turning ON Q31. This will turn OFF Q32 so that its collector potential will go more negative and cause the base of Q33 to go negative. The emitter of Q33 will likewise go negative and Q34 will therefore turn ON and light the normally extinguished indicator lamp 238 to indicate that a "touch" has occurred between the head 12 and disk 10. When Q34 goes ON its collector will rise to approximately ground potential thereby turning OFF Q35 and de-energizing the head retract solenoid 198" to effect head retraction. The circuit can be reset by manually operating a normally open switch S6. Manual retraction of the head 12 can be effected by closing a normally open switch S7. Closing of this switch will lock the Schmitt trigger circuit 234 in the "touch" condition, and in this case the switch S6 will be ineffective to reset.

While the circuit variations shown in FIGS. 4 and 5 have been illustrated only with respect to the "touch" and head retract aspects, it is understood that the sensing circuit 208 (FIG. 3) may readily be applied to theses circuits to incorporate therein the feature of separating the head and disk in the event of rotational slow-down of the disk, as described earlier.

While there have been shown and described a circuit arrangement and variations thereof exemplary of the principles of the invention, it is to be understood that these are but specific forms thereof and that the invention is capable of being constructed in a variety of circuit configurations without departing from its true spirit and scope. Accordingly, the invention is not to be limited by the specific circuits disclosed but only by the subjoined claims.

What is claimed is:

1. An indicator and control circuit comprising, a magnetic record member having an electrically conductive surface, a magnetic transducer member having an electrically conductive surface, said members being arranged with said electrically conductive surfaces separated by a dielectric and being relatively movable toward each other to a position of electrical conduction, a source of electrical energy establishing a potential difference between said electrically conductive surfaces through the dielectric, an electronic control device operative to provide an output in the event electrical conduction is established through said electrically conductive surfaces, indicator means for providing a sensible signal indicative of said electrical conduction, a first bistable circuit device normally in one of its stable states and responsive to the output of said electronic control device for switching to the other of its stable states to thereby actuate said indicator means, circuit means operable for effecting a separation of said magnetic record member and said magnetic transducer member, a second bistable circuit device normally in one of its stable states and adapted to be switched to its other stable state to operate said circuit means, delay means adapted to be actuated by the output of said electronic control device for providing a delayed signal a predetermined time after said electrical conduction occurs, and a coincidence detector arranged to be actuated by the output of said electronic control device and said delayed signal for switching said second bistable circuit device.

2. An electrical circuit comprising a rotating electrically conductive record member and an electrically conductive transducer member separated by a dielectric and relatively movable toward each other to a position of electrical conduction, a source of electrical energy coupled to one of said electrically conductive members and establishing a difference in potential between said members through the dielectric, an electrical device operative to provide an output signal in the event an electrical conduction is established through said electrically conductive members, delay means adapted to be actuated by said output signal for providing a delayed signal a predetermined time after electrical conduction occurs, means responsive to said output signal and said delayed signal for separating said electrically conductive members, a pulse source actuated by each rotation of said record member for generating a sync pulse, sensing means including a delay circuit responsive to a predetermined increase in the time period between successive sync pulses which results in said time period being longer than the delay time of said delay circuit for providing an output signal, and circuit means directing said last-mentioned output signal to said means for causing said conductive members to separate.

3. An electrical circuit for causing a magnetic read-write head to be drawn away from a rotating record member when the spacing between said head and said record member falls below a desired minimum distance comprising, a source of D-C electrical potential establishing a potential difference across the gap between said head and said record member sufficient to enable a detectable current to flow when said gap decreases below said desired minimum distance, circuit means responsive to said current flow connected to a bistable device thereby causing said bistable device to switch to its opposite operating state and to provide an output signal, pneumatic means operable for increasing said gap, solenoid means responsive to said output signal for operating said pneumatic means for causing said gap to increase thereby preventing damage which would otherwise result from an abrasive contact between said head and said record member, means synchronized with said record member rotation providing periodic clock pulses, delay multivibrator means triggered by each said clock pulse and arranged to generate an output pulse after a predetermined time period, reset means responsive to said clock pulses for re-establishing the multivibrator delay period, thereby preventing the multivibrator output pulse each cycle during which the record member is exceeding a predetermined minimum speed, and mixing means causing said solenoid means to respond to said multivibrator output pulse when it occurs to increase said gap.

References Cited

UNITED STATES PATENTS

| | | | |
|---|---|---|---|
| 2,772,135 | 11/1956 | Hollabaugh et al. | 340—174.1 X |
| 3,201,526 | 8/1965 | Wessels et al. | 179—100.2 |
| 3,225,337 | 12/1965 | Jacoby | 340—174.1 |

BERNARD KONICK, *Primary Examiner.*

A. I. NEUSTADT, *Assistant Examiner.*